UNITED STATES PATENT OFFICE.

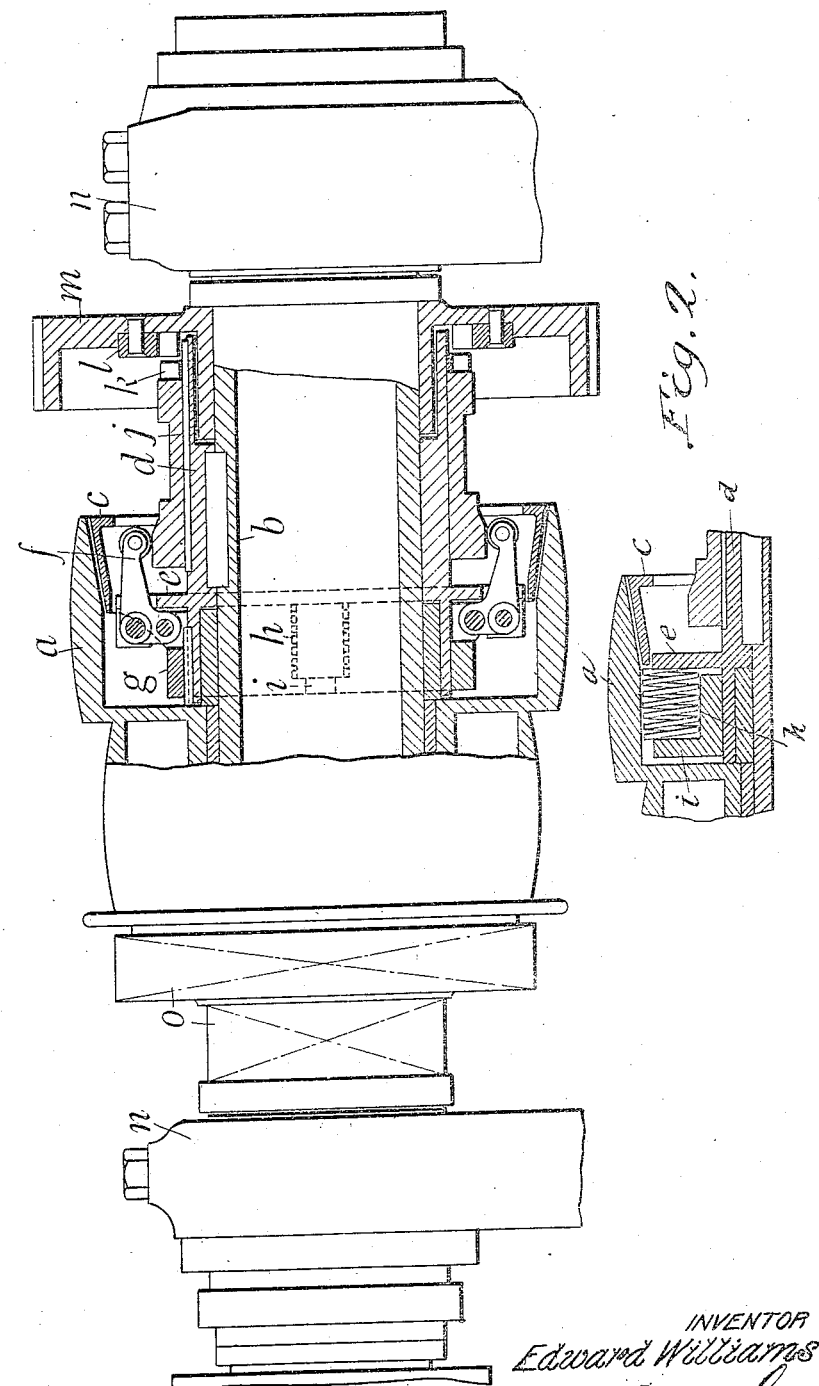

EDWARD WILLIAMS, OF EDGBASTON, BIRMINGHAM, ENGLAND.

CLUTCH.

1,259,328.   Specification of Letters Patent.   Patented Mar. 12, 1918.

Application filed July 26, 1916. Serial No. 111,392.

*To all whom it may concern:*

Be it known that I, EDWARD WILLIAMS, a subject of the King of Great Britain and Ireland, residing at 17 Sandon road, Edgbaston, in the city of Birmingham, England, have invented certain new and useful Improvements Relating to Clutches, of which the following is a specification.

This invention has for its object to construct an improved clutch applicable for a variety of purposes but adapted more especially for use in machine tools such as lathes, milling machines and the like.

The invention comprises the combination with an inner conical sliding member and a complementary outer member, of bell crank levers connected at one end to the inner member, a plate or its equivalent on which the levers are mounted by pivots situated between the ends of the levers, said plate being fixed without axial freedom on a central shaft and situated within the clutch, and a stepped or conical collar slidably mounted on the shaft and adapted to engage the other ends of the levers, the arrangement being such that by an axial movement of the collar the levers are actuated for disengaging the clutch members or permitting them to engage under the action of springs.

The invention also comprises the construction of the collar to form part of a dog clutch and to insure the inoperability of the friction clutch when the dog clutch is in action.

In the accompanying sheet of explanatory drawings Figure 1 illustrates in section a clutch constructed in accordance with this invention for a lathe headstock.

Fig. 2 is a section on a plane at right angles to that of Fig. 1 of a portion of the mechanism showing particularly one of the springs whereby the clutch members are engaged.

The outer clutch member $a$ forms part of a single or stepped belt pulley (or gear wheel) and is internally coned. This member rotates freely on the hollow shaft $b$. Within the outer member is the externally coned sliding inner member $c$ which by means of an extension $g$ is feather-keyed to a sleeve $d$ on the shaft. The extension $g$ is inclosed within the outer member $a$. Within the inner member are pivoted on a plate $e$ attached to or formed with the sleeve a number of bell-crank levers $f$ which at one end are connected to the central extension $g$ of the inner member $c$. The plate is fixed on the sleeve $d$ and is not capable of moving in an axial direction. Springs $h$ inclosed in the annular space between the extension $g$ and the outer clutch member are situated between the plate $e$ and lugs $i$ on the extension $g$. The said springs tend to keep the inner clutch member in engagement with the outer member. Operation of the levers is effected by a sliding stepped or conical collar $j$ feather-keyed to the sleeve $d$, the said collar being adapted to act on the outer ends of the levers. The collar is operated by the usual fork. Gaps are provided between the inner clutch member and its extension to accommodate the levers and the ears on the plate to which they are pivoted.

When the larger portion of the collar is brought to bear against the levers, the latter move the inner clutch member to the out-of-service position against the springs, and when the smaller portion bears against the levers the latter permit the springs to engage the inner clutch member with the outer member.

In the arrangement shown the collar is constructed at the end opposite to that which operates the above mentioned levers, to serve as an element $k$ of a dog clutch, the complementary element $l$ being mounted freely upon the shaft. The larger part of the stepped portion is then made long enough to hold the friction clutch out of action so long as the parts of the dog clutch are connected. The part $l$ of the dog clutch may form part of a gear wheel $m$ by which motion can be transmitted to the shaft.

The shaft is carried in suitable end bearings $n$ and the pulley is provided with additional gear wheels as $o$ for engaging any other part of the headstock mechanism. Any suitable variations may be made in detail features in applying the invention to the driving shafts of other machine tools or the like.

Having thus described my invention what I claim as new and desire to secure by Letters Patent is:—

1. In clutches, the combination comprising an internally coned outer driving member, an externally coned inner driven member, both carried on a shaft, a central extension from the driven member extending within and inclosed by the driving member, a plate secured to the shaft and situated within the driven member, bell crank levers pivoted at one end to the said central extension and between their ends to the plate, a stepped collar slidably mounted on the shaft and arranged to engage the outer ends of the said levers, lugs radiating from the said central extension, and springs situated between the lugs and the plate, the collar acting on the levers serving to disengage the driving and driven members and the springs to engage them, substantially as described.

2. In clutches, the combination comprising an internally coned outer driving member, an externally coned inner driven member, both carried on a shaft, a plate secured to the shaft and situated within the driven member, bell crank levers pivoted at one end to the driven member and between their ends to the plate, a stepped collar slidably mounted on the shaft and arranged to engage the outer ends of the said levers, lugs on a portion of the driven member within the driving member, springs situated between the lugs and the plate, the collar acting on the levers serving to disengage the driving and driven members and the springs to engage them, dog clutch elements on the end of the collar opposite to that which actuates the levers, a wheel mounted freely on the shaft and complementary dog clutch elements on said wheel, substantially as described.

In testimony whereof I have signed my name to this specification.

EDWARD WILLIAMS.

Copies of this patent may be obtained for five cents each, by addressing the "Commissioner of Patents, Washington, D. C."